(No Model.) 8 Sheets—Sheet 1.

A. F. PFISTER.
REPEATING WATCH.

No. 368,002. Patented Aug. 9, 1887.

Fig. 1

WITNESSES:
C. Neveux
C. Sedgwick

INVENTOR:
A. F. Pfister
BY Munn & Co
ATTORNEYS.

(No Model.) 8 Sheets—Sheet 2.
A. F. PFISTER.
REPEATING WATCH.

No. 368,002. Patented Aug. 9, 1887.

Fig. 2

WITNESSES:
C. Neveux
C. Sedgwick

INVENTOR:
A. F. Pfister
BY Munn & Co.
ATTORNEYS.

(No Model.) A. F. PFISTER. 8 Sheets—Sheet 3.
REPEATING WATCH.

No. 368,002. Patented Aug. 9, 1887.

Fig. 3

WITNESSES:
C. Neveux
C. Sedgwick

INVENTOR:
A. F. Pfister
BY Munn & Co
ATTORNEYS.

(No Model.) 8 Sheets—Sheet 4.

A. F. PFISTER.
REPEATING WATCH.

No. 368,002. Patented Aug. 9, 1887.

Fig. 4

WITNESSES:
C. Neveux
C. Sedgwick

INVENTOR:
A. F. Pfister
BY Munn & Co
ATTORNEYS.

(No Model.) 8 Sheets—Sheet 6.

A. F. PFISTER.
REPEATING WATCH.

No. 368,002. Patented Aug. 9, 1887.

WITNESSES:
C. Neveux
C. Sedgwick

INVENTOR:
A. F. Pfister
BY Munn & Co
ATTORNEYS.

(No Model.) 8 Sheets—Sheet 7.

A. F. PFISTER.
REPEATING WATCH.

No. 368,002. Patented Aug. 9, 1887.

WITNESSES:
C. Neveux
C. Sedgwick

INVENTOR:
A. F. Pfister
BY Munn & Co.
ATTORNEYS.

N. PETERS, Photo-Lithographer, Washington, D. C.

(No Model.) 8 Sheets—Sheet 8.
A. F. PFISTER.
REPEATING WATCH.

No. 368,002. Patented Aug. 9, 1887.

WITNESSES:
C. Neveux
C. Sedgwick

INVENTOR:
A. F. Pfister
BY Munn & Co
ATTORNEYS.

UNITED STATES PATENT OFFICE.

AMI F. PFISTER, OF LOCLE, SWITZERLAND.

REPEATING-WATCH.

SPECIFICATION forming part of Letters Patent No. 368,002, dated August 9, 1887.

Application filed May 6, 1886. Serial No. 201,280. (No model.)

*To all whom it may concern:*

Be it known that I, AMI F. PFISTER, of Locle, Switzerland, have invented a new and Improved Repeating-Watch, of which the following is a full, clear, and exact description.

The object of my invention is to provide new and useful improvements in repeating-watches, whereby the intervals between the striking of the hours and of the quarters, also between the quarters and the minutes, or the five minutes, according to the construction, will be always constant, the whistling of the train usually following the minute strokes will be obviated, the repeating mechanism will not encroach upon the movement, and other important advantages are secured.

The invention consists, principally, in a device for obstructing the hammers for a constant interval between the hour and the quarter, quarter and minute, &c., strokes; also in novel means for disengaging the winding mechanism when the repeater is to be used.

The invention further consists in the arrangement of the gongs and the striking mechanism under the dial, and, finally, of various parts and details and combinations of the same, as hereinafter fully described, and then pointed out particularly in the claims.

Reference is to be had to the accompanying drawings, forming a part of this specification, in which similar letters of reference indicate corresponding parts in all the figures.

A designates the winding and setting stem; $A'$, its crown-wheel; B, a spur-wheel in gear therewith; C, a cog-wheel mounted loosely on the mainspring-arbor $C'$ and engaged by the spur-wheel B.

$C^2$ is a curved piece held in an annular recess in the face of the cog-wheel C; $C^3$, a pawl pivoted to the end of the curved piece $C^2$; $C^4$, an extension of the piece $C^2$, forming the spring of the pawl $C^3$, and $C^5$ a ratchet-wheel fixed on the mainspring-arbor $C'$ and engaged by the pawl $C^3$.

The gearing described is essentially that usually employed for winding up the mainspring from the stem A. On the part of the arbor $C'$ projecting through the base-plate D of the works is fixed a second ratchet-wheel, $D'$, Fig. 9, with which engages a spring-actuated pawl, $D^2$, pivoted to the under side of a large cog-wheel, $D^3$, which is mounted loosely on the arbor $C'$, so that the cog-wheel $D^3$ and the repeating-train in gear therewith is revolved by the mainspring, while the mainspring-arbor is free to turn in winding. The cog-wheel $D^3$ engages with the pinion E, turning with the cog-wheel $E'$ on a stud projecting from the base-plate D. The cog-wheel $E'$ engages with the gear-wheel $E^2$, carrying the star-wheel $E^3$, the teeth of which act upon the prongs $F'\,G'$ of the hammers G F, which are pivoted upon studs $F^2\,G^2$, and are adapted to strike the circular wire spring-gongs $F^3\,G^3$, secured at one end to the base-plate D and extending around the circular edge thereof, the base-plate being peripherally grooved, as shown, to better accommodate the gongs. The hammers F G are pressed against the gongs $F^3\,G^3$, when permitted by the teeth of the star-wheel $E^3$, by springs $F^4\,G^4$, acting upons pins or studs $F^5\,G^5$ on the hammers, and the hammers are caused to rebound after striking by spring check-arms $F^6\,G^6$, acting on the same pins as the springs $F^4\,G^4$, so as to produce ringing blows.

The cog-wheel $E^2$, carrying the star-wheel $E^3$, engages with a pinion, H, fixed on the spindle $H'$, which is mounted to revolve in the base-plate D, and a bearing, H², secured to the base-plate. The spindle H' projects through the base-plate and carries thereat a pinion in gear with the usual governor-train, A², by which the operation of the repeating-train is regulated. On the spindle H' is rigidly mounted a two-toothed pinion, H³, which engages with and swings in the direction of the arrow, Fig. 2, the three segmental racks I K L, (shown detached in Figs. 10, 11, and 12,) formed on the ends of curved arms I' K' L', of which the arms I' L' are pivoted on a stud, M, projecting from the base-plate, and the arm K' on a stud, M', on the base-plate. On the stem H' of the two-toothed pinion H³ is also fixed a cross-piece, H⁴, having beveled ends, which engage a stud, I⁴, on the upper rack, I, and serve as a stop to limit its motion, as well as its own rotation and that of the train of gearing connected therewith, as hereinafter clearly explained.

I is the minute-rack, K the fifteen-minute or quarter-hour rack, and L the hour-rack. The rack-arms I' K' L' are provided with curved extensions I² K² L², and the racks are pressed in the inverse direction of their arrow, Fig. 2, before mentioned, and the extremities of their curved extensions I² K² L² into contact with the stepped edges of the usual time-cams, I⁵ K⁵ L⁵, by the springs I³ K³ L³, which act on shoulders or projections on the rack-arms. The hour cam or snail L⁵ is provided with twelve steps and turns on the stud M², with the star-wheel L⁷, having twelve teeth.

With the teeth of the star-wheel L⁷ engages a lug, M³, fixed to the under side of the hour spur-wheel M⁴ or the quarter-snail K⁵ attached thereto, so that the star-wheel L⁷ is turned the distance of one tooth by each revolution of the hour-wheel M⁴, and is held in such position by the headed spring-pawl M⁵ entering the tooth-spaces of the star-wheel.

The quarter cam or snail K⁵, attached to the under side of the hour-wheel M⁴, has four steps on its edge, and is engaged by the quarter-rack extension K², as before stated. The hour spur-wheel M⁴ engages with a pinion, M⁶, mounted to turn loosely on the stud M², and to the pinion M⁶ is attached the minute cam or snail I⁵, the proportion of teeth of the wheel M⁴ and pinion M⁶ being as four is to one, so that the minute-cam I⁵, which has fifteen steps, is rotated four times for each revolution of the hour-wheel M⁴, each step corresponding to a minute of time.

Figure 17:
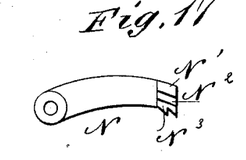
Fig. 17 is a detail view of the stepped pawl engaging the time-racks.

With the striking-racks I K L, as they are swung in the direction of their arrow by the rotation of the two-toothed pinion H³, engages a pawl, N, (shown detached in Fig. 17,) pivoted to the base-plate and held normally in engagement with the racks by the spring N⁴. The pawl N is provided with three stepped teeth, N' N² N³, of which the upper and shortest tooth, N', engages the minute-rack I, the middle tooth, N², engages the quarter-rack K, and the lower and longest forked tooth, N³, the hour-rack L.

Figures 10, 11, 12, 13, 14, 15, 16:
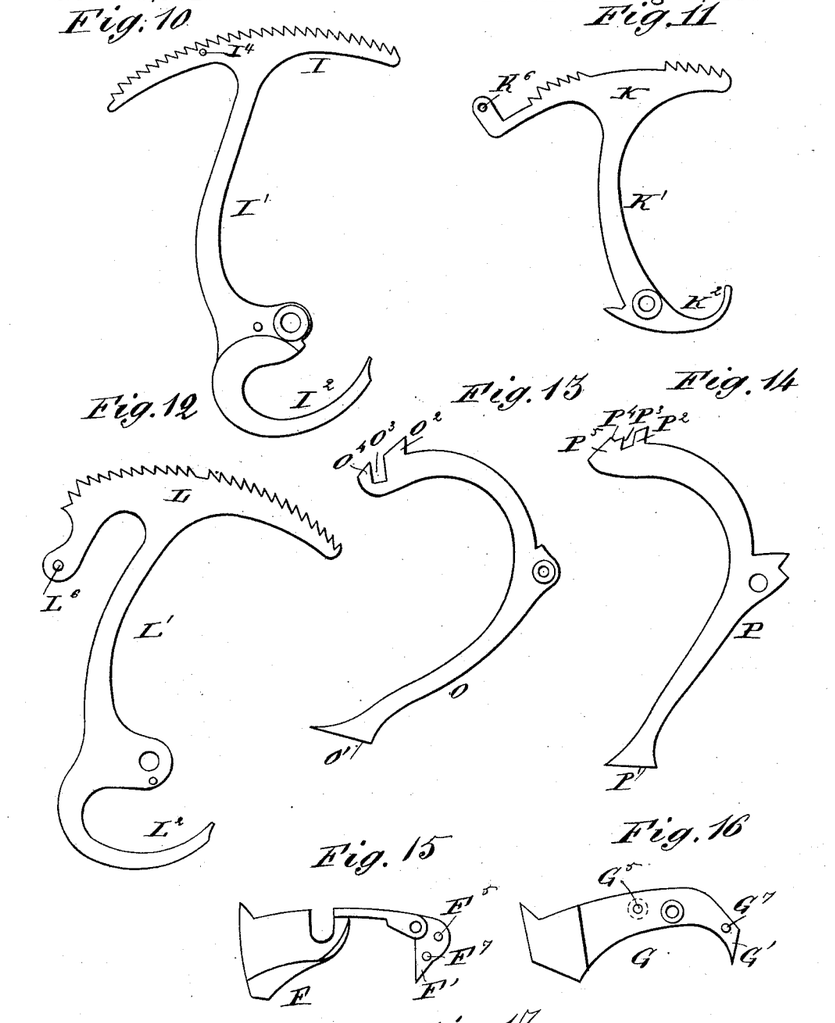
Fig. 10 is a detail view of the minute-rack.
Fig. 11 is a detail view of the quarter-hour rack.
Fig. 12 is a detail view of the hour-rack.
Figs. 13 and 14 are detail views of the hammer-obstructing levers.
Figs. 15 and 16 are detail views of the gong-hammers.

The last tooth-space of each rack K and L is cut deeper than the other tooth-spaces, as shown in Figs. 11 and 12, so that as the racks I K L are moved the distance of one tooth by a half-revolution of the two-toothed pinion H³ each rack is engaged successively by the corresponding tooth, N' N² N³, of the pawl N, and is thus prevented from swinging back between the contacts of the two teeth of the pinion H³—that is, the tooth N³ engages with the hour-rack, following up its intermittent motion from the pinion H³, and the remaining teeth, N' N², being held meanwhile out of engagement with their respective racks from their lesser lengths until the tooth N³ enters the last and deep tooth-space of the hour-rack. The tooth N³ then does not engage the rack, but allows the tooth N² to engage its rack K, on entering the last deep tooth-space of which the tooth N² acts in a similar manner to permit the engagement of the tooth N' with its rack L. Each rack I K L is thus swung in succession from its primary position, which is determined by the position of its corresponding cam, I⁵ K⁵ L⁵, in the usual manner to its final position, as stated. Upon a stud, N⁵, fixed upon the base-plate D, are pivoted two curved levers, O P. (Shown in detail in Figs. 13 and 14.)

The lever O is provided at one end with the wide straight edge O', arranged in the path of a pin or stud, K⁶, projecting from an end extension of the quarter-rack K. The lever P is also provided with the straight end edge, P', in the path of a pin, L⁶, fixed on an end extension of the hour-rack L. The lever O at its other end is provided with the wide projection O², recess O³, and lug O⁴, and the lever P with the lug P², recess P³, shoulder P⁴, and wide projection P⁵, all arranged to engage pins F⁷ G⁷ on the prongs F' G' of the striking-hammers F G, as hereinafter fully described.

Figure 2:
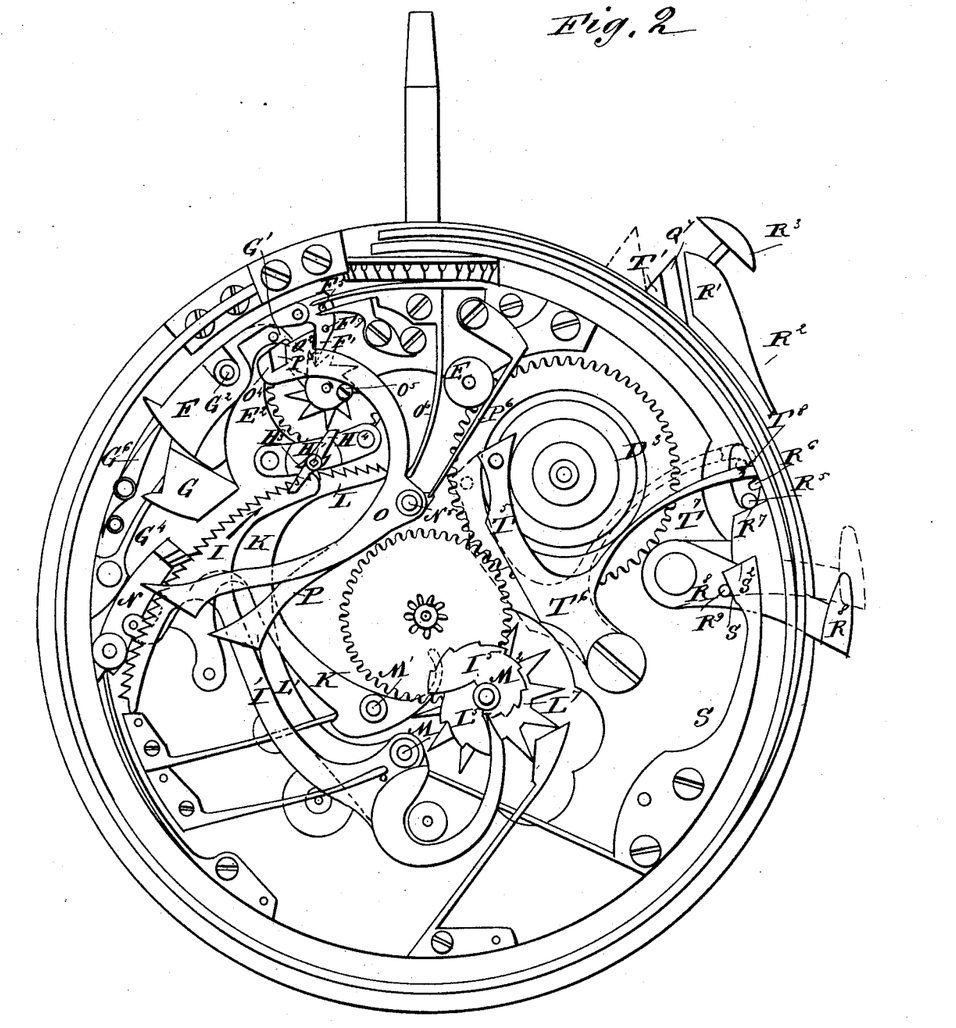
Fig. 2 is a similar view, showing the repeating mechanism about to strike the hours.

The levers O P, when disengaged, as in Fig. 2, are pressed lightly against a screw or stop, O⁵, by springs O⁶ P⁶, attached to the base-plate or a bracket thereon, and acting on shoulders or projections formed on the levers near their pivotal points.

Figure 5:
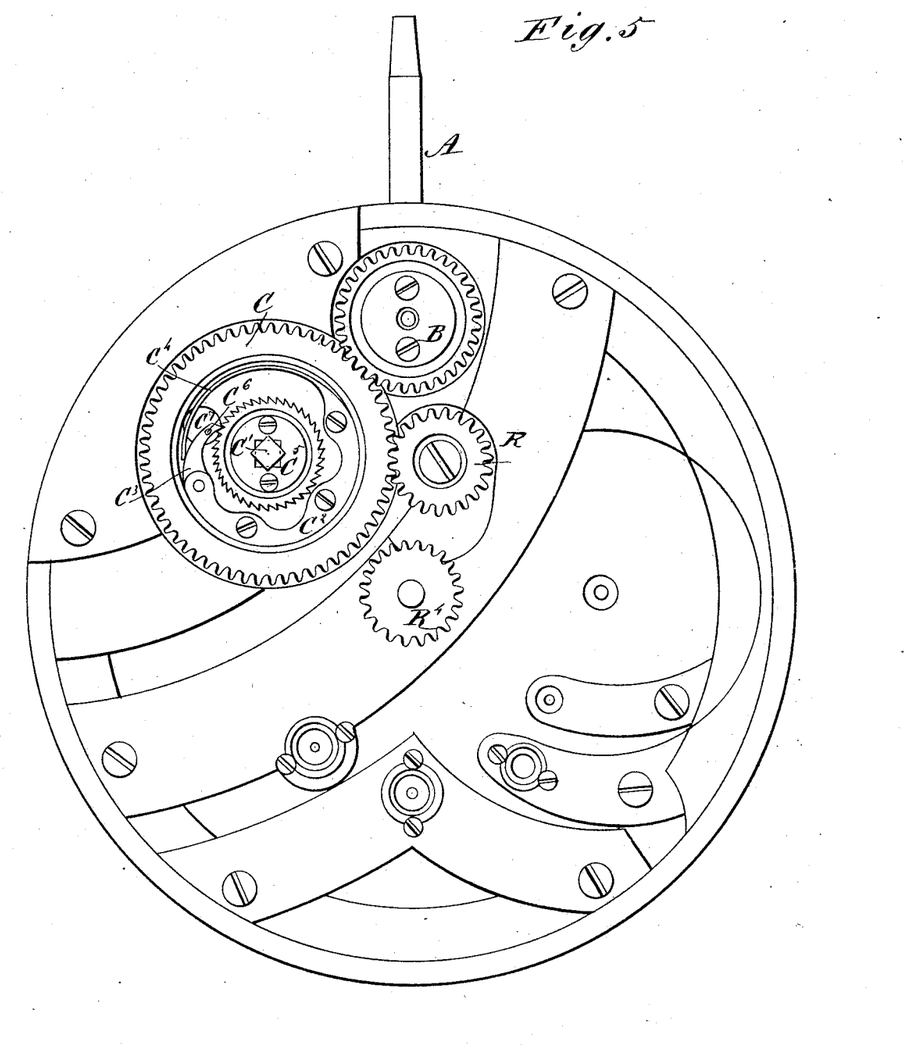
Fig. 5 is a rear view showing the movement.
Figure 7:
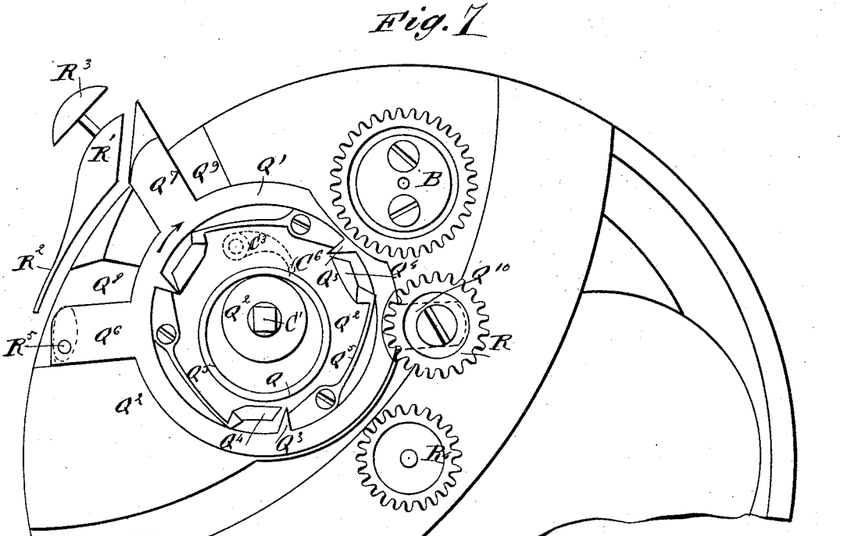
Fig. 7 is a rear view, parts being removed to show the mechanism for disengaging the mainspring from the winding mechanism.
Figure 8:
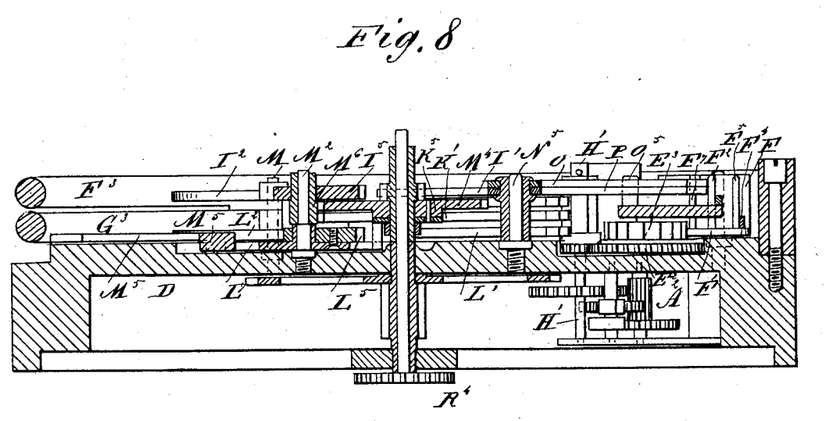
Fig. 8 is a cross-sectional view on the line $x\,x$, Fig. 1.
Figure 9:
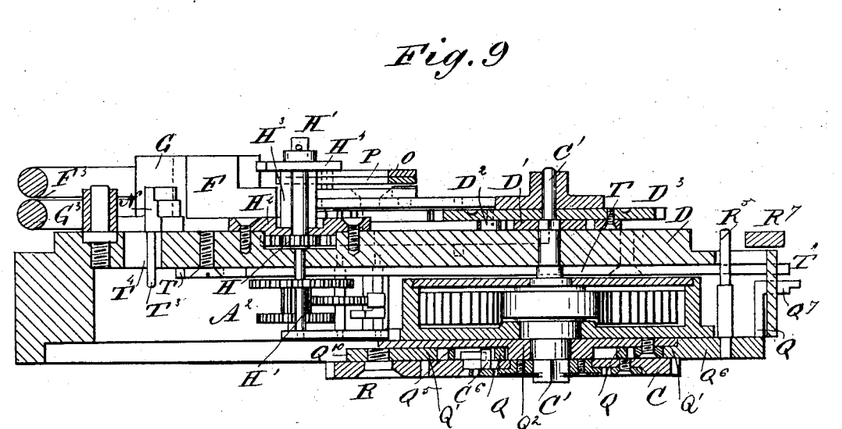
Fig. 9 is a cross-sectional view on the line $y\,y$, Fig. 1.

In order to disengage the mainspring from the winding-stem A when the repeating-train is to be used, I employ the following arrangement. (Shown most clearly in Figs. 5, 7, and 9.) A pin, C⁶, is attached to the pawl C³, engaging the ratchet-wheel on the mainspring-arbor C', projects through a slot, C⁷, in the cog-wheel C, and rests against the periphery of a loose ring, Q. The ring Q is placed within a flat ring, Q', mounted to turn slightly in a circular recess formed in the plate Q² of the works, and is inclosed between the bottom of said recess and the cog-wheel C, which rests on the flat ring Q'. The flat ring Q' is provided with the three internal beveled teeth, Q³, which engage the beveled heads Q⁴ of the springs Q⁵, which are secured at the bottom of the recess in the fixed plate Q². The flat ring Q' is also provided with the two radial arms Q⁶ Q⁷, which project at the edge of the works through slots Q⁸ Q⁹ in the edge of the plate Q², the slots being somewhat wider than the arms Q⁶ Q⁷ to permit the before-mentioned rotative movement of the flat ring Q'; and on an arm, Q¹⁰, of the ring, opposite the arms Q⁶ Q⁷, is mounted to revolve the loose spur-wheel R, which is constantly engaged with the spur-wheel C. The outer end of the ring-arm Q⁷ is bent transversely to the rim of the works, then radially outward, as shown in Figs. 7 and 9, and its outer end is beveled for engagement by the beveled head R' of a curved spring R², attached to the circular-edge works in any usual way, and provided with a push-button, R³. Thus by pressing the button R³ the flat ring Q' is turned in the direction of its arrow, Fig. 7, and the beveled edges of its internal teeth, Q³, act upon the beveled heads Q⁴ of the fixed springs Q⁵, so as to press the several heads, Q⁴, equally inward against the loose ring Q, thus centering the same. The outer edge of the ring Q strikes and presses outward the pin C⁶, attached to the pawl C³, and disengages the same from its ratchet-wheel C⁵ on the mainspring-arbor, thereby throwing the mainspring out of gear with the winding mechanism. By the same movement of the flat ring Q' and its arm Q¹⁰ the loose spur-wheel R is swung into gear with the spur-wheel R⁴ on the hand-arbor while remaining in gear with the wheel C, so that the hands can be set by means of the winding-stem A.

Figure 1:
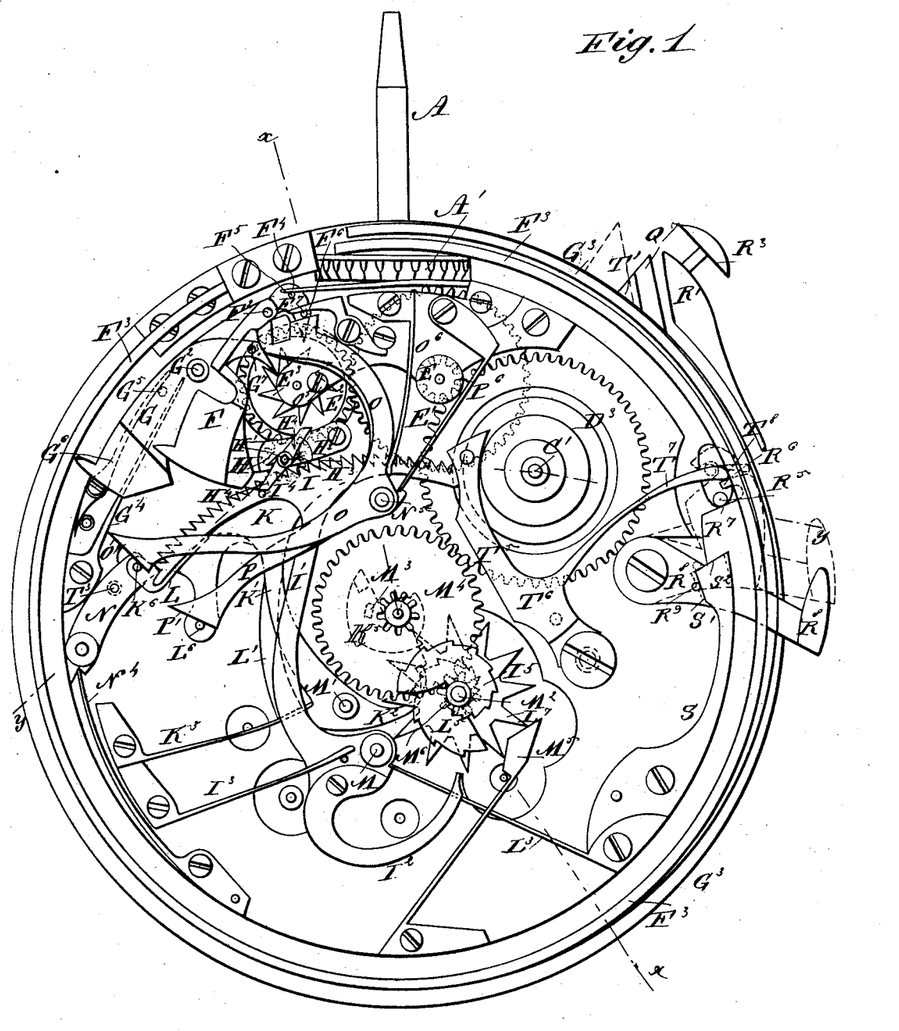
Figure 1 is a face view showing the repeating mechanism of the watch in its usual position after striking, the case and dial being removed.

From the arm Q⁶ of the flat ring Q' projects a pin, R⁵, at right angles through a recess in the works, as shown clearly in Fig. 9. The front projecting end of the pin is engaged by the hook R⁶ and cam-edge R⁷ on an extension of the click R⁸, which is pivoted to the front of the base-plate D, as shown in Figs. 1 and 2. When the click R⁸ is swung toward the winding-stem A, as indicated in dotted lines in Fig. 1, its cam-edge R⁷ acts upon the pin R⁵ on the arm Q⁶ to turn the ring Q', disengage the pawl C³, and throw the winding-stem in gear for setting the hands, as before, and when the click is swung in the inverse direction its hook R⁶ engages the pin R⁵ and returns the pawl C³ and loose spur-wheel R to their normal position.

The click R⁸ is held in either of its two positions by the engagement of a pin, R⁹, on the same with one of the beveled edges S' S² of the head of the spring S, fixed to the base-plate.

Figure 6:
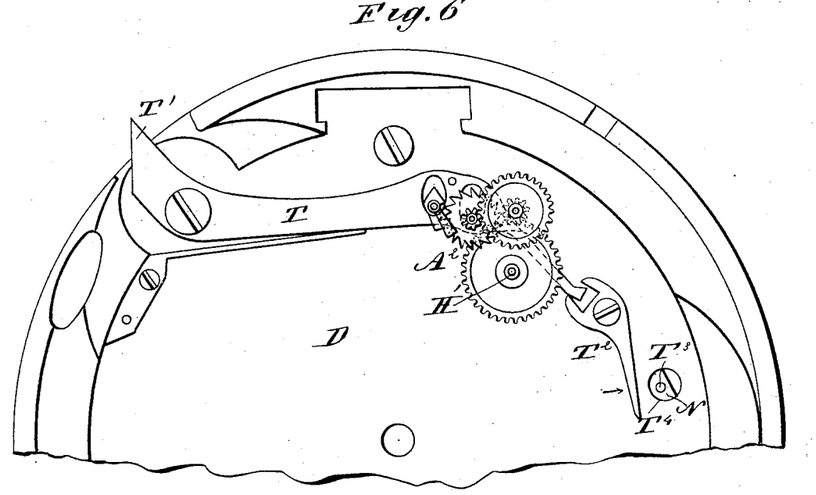
Fig. 6 is a rear view, parts being removed to show the devices for releasing the time-racks and also part of the repeating-train.

Near the beveled end of the arm Q⁷ of the flat ring Q', and in position to be acted upon by the push-button R³ simultaneously therewith, is arranged the beveled end T' of a bent lever, T, Fig. 6, pivoted near said beveled end to the base-plate D, slotted to accommodate the gearing of the governor-train A², as shown, and having the end of its longer arm engaged with the forked end of a pivoted angle-lever, T². The straight end of the angle-lever T² is adapted to strike a pin, T³, projecting through a slot, T⁴, in the base-plate, D, from the stepped pawl N, and press the same outward from its engagement with the striking-racks I K L. The cross-piece or stop H⁴ on the two-toothed pinion H³ being at such an angle with the opposite teeth of the pinion H³ as to hold said teeth out of engagement with the striking-racks when the stop H⁴ is in contact with the minute-rack stud I⁴, as in Fig. 1. On operating the push-button R³ the pawl N is disengaged momentarily from the racks I K L, allowing them to be returned by their springs I³ K³ L³ to the positions determined by their time cams or snails I⁵ K⁵ L⁵, as illustrated in Fig. 2. The racks are then turned by the repeating-train and pinion H³ and are stopped successively by the obstructing-levers O P and stop H⁴, as hereinafter described. The end of the minute-rack I, near the end of its movement, strikes the arm T⁵ of an angle-lever, T⁶, pivoted to the base-plate D. The other arm, T⁷, of said angle-lever is formed with a head, T⁸, which strikes the pin R⁵, which has been displaced, as indicated in dotted lines in Fig. 2, by the action of the push-button R³ on the flat ring Q', as before stated, and returns said pin to its normal position, thereby turning the ring Q' in the inverse direction, engaging the pawl C³ with its ratchet wheel C⁵ and disengaging the loose spur-wheel R from the hand-arbor wheel R⁴. The watch is thus automatically set for winding after the repeater has struck.

The arm T⁷ of the angle-lever T⁶ is made thin and elastic to permit the click R⁸ to be pushed forward for setting the hands without affecting the minute-rack I in contact with the arm T⁵ of the angle-lever.

The operation of the obstructing-levers O P on the repeating mechanism is as follows: As before stated, when the push-button R³ is operated it acts simultaneously upon the beveled end T' of the starting-lever T and the beveled end of the arm Q⁷ of the flat ring Q', so as to release the striking-racks I K L and allow them to be returned by their actuating-springs to the position shown in Fig. 2, and to disengage the winding mechanism and permit the mainspring in uncoiling to drive the repeating-train alone. The two-toothed pinion, which is driven by the repeating train, as described, gives an intermittant forward motion to all the racks simultaneously; but only the hour-rack L at starting being dogged by the stepped pawl N, it alone is moved continuously forward by the pinion H³, the other racks returning after each slight impulse from the pinion to their primary position. Each tooth on the hour-rack L corresponds with a step on the hour-cam L⁵ and a tooth on the star-wheel L⁷, and the same is true with the racks I K and their cams or snails I⁵ K⁵. The connecting-gearing of the time-racks and the hammer-releasing star-wheel E³ is so proportioned that a movement of each rack in succession through the distance of one tooth occurs with each stroke of the hammers.

Let us assume that the time is four hours and twenty minutes when the repeater is struck.

Figure 3:
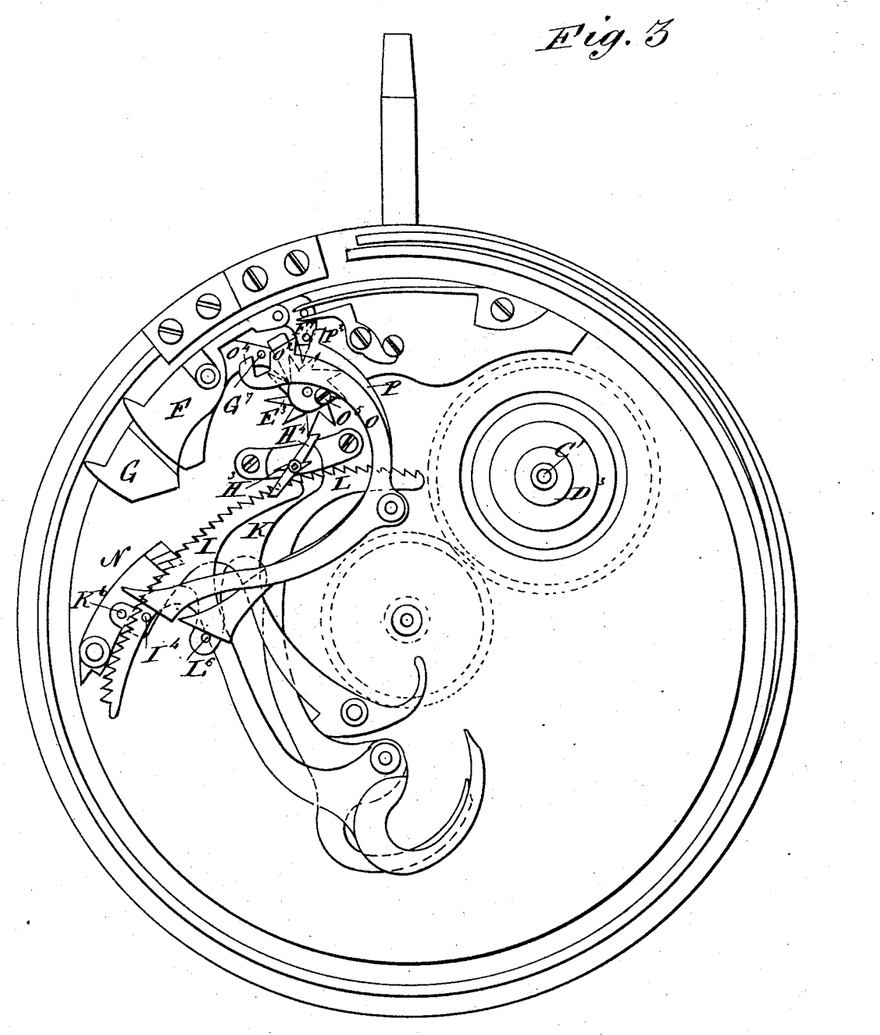
Fig. 3 is a view of part of the repeating mechanism about to strike the quarter-hours.
Figure 4:
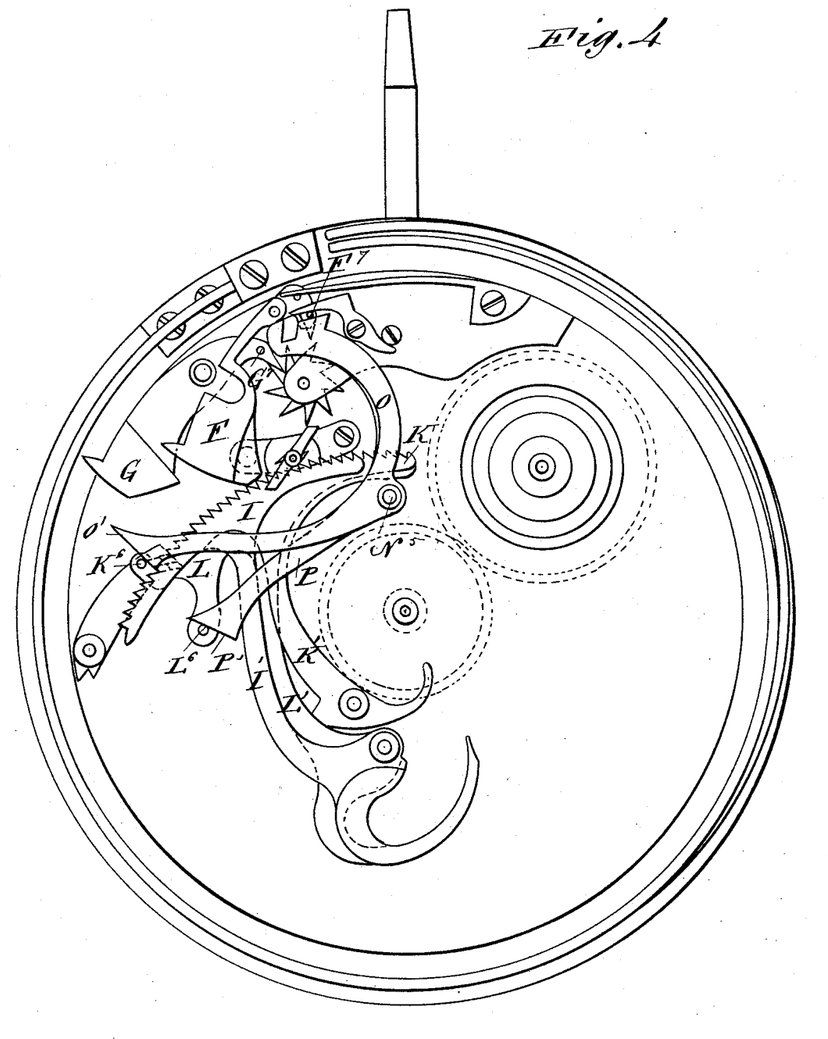
Fig. 4 is a similar view, the repeating mechanism being about to strike the minutes.

Then, the three racks being released by the push-button R³, the hour-rack L is swung back by its actuating-spring through a distance of four teeth, its extension L² striking the fourth step of its cam or snail L⁵. The quarter-rack K is swung back through a distance of one tooth, and the minute-rack I five teeth. The cross-piece or stop H⁴ being left free, the repeating-train is released, and both hammers between the engagements of the star-wheel E⁵, with their prongs, are forced outward by their actuating springs F⁴ G⁴. The obstructing-levers O P being in the position shown in Fig. 2, the pin F⁷ on the prong of the hammer F passes to the right of the projection O² and lug P² of the levers and permits the hammer F to strike the gong F³. The hammer G, on the contrary, is prevented from striking the gong G³ by its pin G⁷ coming in contact with the projection P⁵ of the lever P, and thus produces a "dumb blow." The hammer F thus strikes the gong F³ four times, or until the four teeth of the rack L have run out, when the pin L⁶ on the same strikes the straight edge P' of the lever P and slightly swings the same until the lug P² presents itself to the pin F⁷ on the hammer F, and prevents its impact on the gong F³, while the wide projection P⁵ on the lever P still checks the pin G⁷ of the hammer G. The widths of the projection P⁵ and lug P² being proportioned so as to check the pins G⁷ F⁷ during the period of one tooth-space on the hour-rack, neither gong is sounded during this interval; but on the passage of the next rack-tooth the obstructing-lever P is swung still farther until the recess P³ is presented to the hammer-pin F⁷, and the pin G⁷ is permitted to pass to the left of the projection P⁵ and into the recess O³ of the lever O, as yet unmoved, as shown in Fig. 3, so that both hammers are free to strike. At the same time the pawl N enters the last deep tooth-space of the hour-rack L and no longer dogs the same, but engages the quarter-rack K, which is turned, as before stated, by the pinion H² through a distance of one tooth, the distance it was originally swung back. Both hammers being free, they strike the gongs F³ G³ simultaneously, or in quick succession, so as to produce a single alarm, indicating one quarter-hour, and then the pin K⁶ on the rack K strikes the lever O and turns the same until the projection O² presents itself to the pin F⁷ of the hammer F and the lug O⁴ to the pin G⁷ of the hammer G, so that both hammers are held from impact on their gongs for the period of one rack-tooth space, as before. On the passage of the next tooth of the rack K its pin K⁶ swings still farther the lever O, so that while the wide projection O² still checks the pin F⁷ of the hammer F, the pin G⁷ of the hammer G can pass to the left of the lug O⁴, as shown in Fig. 4, and the hammer G is thus free to strike. At the same time the quarter-rack K, having finished its motion, is released, and the rack I is engaged by the pawl N, as before, so as to be turned the distance of its five teeth. Five blows are thus struck by the free hammer G on its gong G³, when the cross-piece or stop H⁴ engages the stud on the rack I, and thus stops the train. At the same time the winding mechanism is automatically thrown in gear with the mainspring, as before described. The exact time—four hours and twenty minutes—is thus struck, and the intervals between the series of blows maintained constant by a proper proportioning of the obstructing-levers, constructed as specified.

As this mechanism for obstructing the hammers for constant intervals may with equal advantage be applied to all repeaters—as five-minute repeaters, &c., self-striking repeaters employing a separate actuating-spring for the repeating-train, and also clocks—I do not limit myself to the within-described application.

The novel arrangement of the gongs under the dial permits the use of a movement of equal size with that of ordinary watches of the same dimensions.

Having thus fully described my invention, what I claim as new, and desire to secure by Letters Patent, is—

1. In a repeater, the combination, with striking-racks engaging a single pinion and the repeating-train, of hammer-obstructing devices operated by said racks, substantially as shown and described.

2. In a repeater, the combination, with the striking-racks and the repeating-train operating them, of obstructing-levers actuated by said racks and of the gong-hammers, substantially as shown and described.

3. In a repeater, the combination, with the time-racks and the repeating-train, of a stepped pawl engaging the striking-racks and a push-piece for operating it, substantially as shown and described.

4. In a repeater, the combination, with the striking-racks, a single pinion engaging them, and the repeating-train, of a spring-actuated stepped pawl engaging the time-racks, a push-piece, and operating devices connecting the push-piece with the stepped pawl, substantially as shown and described.

5. In a repeating-watch, the combination, with a ratchet-wheel on the mainspring-arbor and a spring-pawl engaging the ratchet-wheel and provided with a pin, of a toothed wheel surrounding the arbor of the mainspring, a loose ring within the toothed wheel, and springs acted upon by the toothed wheel for pressing the loose ring against the pin on the spring-pawl, substantially as herein shown and described.

6. In a repeating-watch, the combination, with a ratchet-wheel on the arbor of the mainspring and a spring-pawl engaging the ratchet-wheel, of an armed toothed wheel surrounding the mainspring-arbor, a loose ring within the toothed wheel and acting on the spring-pawl, springs engaged by the teeth of the said wheel for operating the loose ring, and a push-button acting on an arm of the toothed wheel, substantially as shown and described.

7. In a repeating-watch, the combination, with a cog-wheel and a ratchet-wheel on the arbor, of the mainspring, a pawl on the cog-wheel and engaging the ratchet-wheel, an armed toothed wheel surrounding the mainspring-arbor, and a loose ring operated by the toothed wheel and acting on the pawl, of a loose spur-wheel engaging the cog-wheel on the mainspring-arbor and mounted on one arm of the toothed wheel, a pin on another arm of the same, and a hook-click arranged to engage said pin, substantially as shown and described.

8. The combination, with the pivoted time-racks I K L, the two-toothed pinion $H^3$ engaging them, and the repeating-train, of a spring-acted pawl, N, having the stepped teeth $N'$ $N^2$ $N^3$, the push-button $R^3$, and operating devices connecting the same with the pawl N, substantially as shown and described.

9. The combination, with the pivoted time-racks I K L, the two-toothed pinion $H^3$, the repeating-train, and the stepped pawl N, of the pins $K^6$ $L^6$ on the racks K L, curved levers O P, having cam-edges $O'$ $P'$ and pivoted at $N^5$, and of the hammers F G, operated by the repeating-train and provided with studs acted upon by the levers O P, substantially as shown and described.

10. The combination, with the pivoted time-racks I K L and the repeating-train actuating them, and the racks K L, having pins $K^7$ $L^7$, of the levers O P, having cam-edges $O'$ $P'$, engaged by the pins $K^7$ $L^7$ and provided with lugs or projections $O^2$ $O^4$ and recess $O^3$ and lugs or projections $P^2$ $P^5$ and recess $P^3$, respectively, the spring-acted striking-hammers F G, having pins $F^7$ $G^7$, and the gongs $F^3$ $G^3$, substantially as shown and described.

11. In a repeating-watch, the combination, with the lever T, having a beveled head, $T'$, the rack-pawl N, devices operating the pawl N from the lever T, the mainspring-pawl $C^3$, and the ring $Q'$, having a beveled arm $Q^7$ and devices for disengaging the pawl $C^3$, of the spring $R^2$, having beveled head $R'$ and push-button $R^3$, substantially as shown and described.

12. In a repeating-watch, the combination, with the pawl-disengaging ring $Q'$, having arms $Q^6$ $Q^7$, and the pin $R^5$ on the arm $Q^6$, of the pivoted angle-lever $T^6$, having the spring-arm $T^7$, the time-rack I, and the repeating-train, substantially as shown and described.

13. The combination of the mainspring-arbor $C'$, the ratchet-wheel $C^5$ on the same, the spring-pawl $C^3$, the pin $C^6$ of the same, the loose ring Q, the springs $Q^5$, having beveled heads $Q^4$, the ring $Q'$, having internal teeth, $Q^3$, and arms $Q^6$, $Q^7$, and $Q^{10}$, the loose spur-wheel R on the arm $Q^{10}$, the hand-arbor cog-wheel $R^4$, the pin $R^5$ on the arm $Q^6$, the click $R^3$, having hook $R^6$, and the spring push-button $R^3$, substantially as shown and described.

AMI F. PFISTER.

Witnesses:
ALOIS MINUTTE,
HENRI SANDOS.